United States Patent [19]

Steinbiss et al.

[11] Patent Number: 4,517,020

[45] Date of Patent: May 14, 1985

[54] APPARATUS FOR RAPID BURNING OF THERMALLY PRETREATED FINE GRAINED PRODUCT AND METHOD

[75] Inventors: Eberhard Steinbiss, Düsseldorf; Horst Herchenbach, Hennef, both of Fed. Rep. of Germany

[73] Assignee: Klöckner-Humboldt-Deutz AG, Fed. Rep. of Germany

[21] Appl. No.: 549,771

[22] Filed: Nov. 8, 1983

[30] Foreign Application Priority Data

Nov. 18, 1982 [DE] Fed. Rep. of Germany ....... 3242508

[51] Int. Cl.[3] ........................ C04B 7/02; D06F 58/00; F27B 15/00; F27B 7/32

[52] U.S. Cl. ...................................... 106/100; 34/136; 432/14; 432/58; 432/105; 432/117

[58] Field of Search .................. 432/14, 58, 105, 117; 106/100; 34/136

[56] References Cited

U.S. PATENT DOCUMENTS

| | | | |
|---|---|---|---|
| 2,602,782 | 7/1952 | Zoradi | 432/58 |
| 3,139,273 | 6/1964 | Pittendreigh | 432/105 |
| 4,002,420 | 1/1977 | Christiansen | 106/100 |
| 4,187,071 | 2/1980 | Brachthauser et al. | 432/58 |
| 4,249,892 | 2/1981 | Brachthauser et al. | 432/14 |

*Primary Examiner*—John J. Camby
*Attorney, Agent, or Firm*—Hill, Van Santen, Steadman & Simpson

[57] ABSTRACT

An apparatus for rapid burning of thermally pretreated, at least partially calcined fine grained product to produce cement clinker which includes a thermal reactor having a firing chamber and means for introducing the product to be treated in concurrent flow with and in the area of a flame in the firing chamber. The means for introducing the product includes a vertical shaft which discharges into the firing chamber, together with a deflector which is disposed in the area of the discharge orifice of the shaft, the deflector serving to deflect the hot product which strikes the deflector with substantial kinetic energy due to the force of gravity. The product is broken up into small particles by impacting with the deflector, and is directed substantially parallel to the flame in the firing chamber. The deflector extends at an obtuse angle relative to the axis of the shaft. The apparatus can be connected to a fuel supply and can be utilized as a burner. A feed for an ejection gas can also be provided and equipped with devices for mixing the gas with fuel or it can be connected to a fuel source itself.

13 Claims, 8 Drawing Figures

APPARATUS FOR RAPID BURNING OF THERMALLY PRETREATED FINE GRAINED PRODUCT AND METHOD

BACKGROUND OF THE INVENTION

1. Field of the Invention

This invention relates to an apparatus for rapid burning of thermally pretreated, at least partially calcined fine grained products used in the manufacture of cement clinker. It includes a thermal reactor comprising a firing chamber with a flame therein as well as a means for introducing the product in concurrent flow with respect to the flame.

2. Description of the Prior Art

A standard industrial apparatus for cement manufacture comprises a suspension type heat exchanger wherein raw meal is heated in countercurrent flow with hot gases and is largely calcined upon an addition of fuel. The apparatus also includes a rotary tubular kiln wherein the thermally pretreated product is heated relatively slowly in a product bed up to its sintering temperature and then is heated and sintered up to clinker in countercurrent flow by means of flame gases from a burner.

It was long ago determined as illustrated in German Pat. No. 337,312 of May, 1921 that intimate contact between the flame and the product must occur in order to bring about a better and more efficient utilization of the flame gases.

One proposed solution consisted of a subdivided rotary tubular kiln having a sintering portion which rotated more slowly than its other portion, whereby the kiln for heating up to the sintering point circulated at such high speed that the product was lifted close to the apex of the kiln and fell freely down through the kiln cross section. This device, however, was never significantly commercialized due to the existence of excessive dust and wear.

It was perceived that it would be advantageous for reasons of energy and reaction kinetics to accomplish the heating in the temperature span between approximately 900° C. after calcining of the raw meal and the finish-burning which occurs at approximately 1350° through 1450° C. with the highest possible heating gradients. This lead to a proposal as in East German Pat. No. 97,409 for a rapid burning wherein the powdery or agglomerated mixture was rapidly heated in a fluidized bed in a reactor, and sintered up to the finish-burning temperature. This Letters Patent suggests that it is very advantageous to burn fine grained product in the temperature range between approximately 1100° and 1300° C. with extremely high heating gradients. The advantage is said to be a reduction of the maturing time by about 70% with resulting advantages, for example, due to possible size reduction of the reactor or an increase in its throughput, or completing the finish-burning at lower temperatures with standard dwell times. Extremely high heating gradients in addition avoid deactivation of the product to be burned. This reference, however, does not contain a teaching as to providing an apparatus suitable for such rapid heating.

SUMMARY OF THE INVENTION

The present invention provides an apparatus for rapid burning of thermally pretreated, at least partially calcined fine grained products which enables heating the products in the temperature range of 850° C. to the sintering temperature of approximately 1250° to 1350° C. to be carried out without problems and with extremely high heating gradients occurring. All of this exists without the disadvantages of dust production and excessive wear. In accordance with the invention, the hot raw meal is conveyed as far as possible into the firing zone of thermal reactor and is distributed as uniformly as possible over the volume of the firing chamber, particularly into the convection and radiation zone of the flame.

The apparatus of the present invention includes a thermal reactor having a firing chamber and a flame as well as a means for introducing the product in concurrent flow with and in the area of the flame. In accordance with the present invention, the delivery means includes a vertical shaft which discharges into the area of the firing chamber, together with a deflector which is disposed in the discharge area of the shaft and deflects and breaks up the hot product into a direction approximately the same as that of the flame. The hot product is introduced with large amounts of kinetic energy essentially under the force of gravity.

With the apparatus of the present invention, the hot meal suspended in the gas stream in the same direction as the flame proceeds into the hottest zone of the firing chamber where, as a result of breaking up of the solid particles into the form of a dust cloud, the very large active surface area produced leads to an extremely rapid heating of the product. This result is promoted by an intimate mixing of hot meal and flame gases, the consequence being that the heating process in the temperature span between about 850° and 1250° to 1350° C. as well as at least a part of the sintering process are largely accomplished in suspension with very high temperature gradients.

One feature of the apparatus provides a deflector which extends at an obtuse angle relative to the axis of the hollow shaft, extending essentially over the projection of the shaft cross section as viewed in the axial direction. An extensive breaking up of the product stream injected into the firing chamber is thereby achieved. There is also an optimum, intimate mixing of hot meal and flame in that the means used for delivering the meal discharges into the firing chamber above the flame.

In order to promote the atomization of the meal-type product into an airborne dust cloud which is as homogeneous as possible and to prevent it from eroding the deflector, one feature of the present invention involves providing a feed for an ejection gas which enters from behind in the discharge area closely above the deflector, the axis of the feed device being substantially parallel to the flame, with the feed device being connected to a compressed gas source. With this device, an ejection gas is injected as a pneumostatic protective film between the entering product stream and the deflector, and separates solid particles from the deflector when using an appropriate setting of amount and pressure of gas. The wear problem of the deflector is thus kept under control in a very advantageous fashion.

Another feature of the invention is providing a discharge orifice of substantially rectangular form for injecting the product into the firing chamber, the opening having a width at least twice as great as its height and being connected to the hollow shaft by a funnel-like section of increasing lateral dimension. Particularly favorable flow conditions are achieved when at least two and preferably three feeds for ejection gas discharge are located behind the substantially rectangular opening of the discharge orifice.

In another form of the invention, burner means are included in the firing chamber, together with means for introducing fuel into the burner means. In this arrangement, an optimum mixing of the hot meal and fuel occurs when simultaneously introduced into the firing chamber. Because of the high temperature, approximately 800° to 900° C., of the hot meal, the fuel is spontaneously ignited and the released heat is directly transmitted due to direct contact and radiation to the individual particles of the airborne dust cloud. The heat transmission is thereby significantly improved as compared with conditions in a closed product bed in a rotary tubular kiln. Energy is saved as a result of the more favorable heat transmission conditions and the temperature of the exhaust gas is reduced. This embodiment results in a considerable simplification of the apparatus while improving the burning process.

In another feature of the present invention, a pilot burner can be disposed in the area of the discharge orifice. This feature, however, is required only during the start-up as long as the entering product has not yet reached the ignition temperature.

Another modification consists in equipping the feed or feeds for the ejection gas with devices for mixing the gas with fuel or the feeds can be connected to a fuel source which is a natural gas source. Any type of fuel can be used for this purpose, for example, in gaseous, liquid or solid form in suitable admixture with the ejection gas.

To prevent the apparatus from the effects of high radiation heat or overheating due to the conveyed product, the vertical shaft may be surrounded at least in the firing chamber by a cooling jacket to thereby provide a flow path for a cooling agent between the walls of the shaft and the cooling jacket. The flow path is connected to a source of cooling agent. The flow path may include a discharge opening for coolant immediately above and in the direction toward the deflector. Thus the coolant emerges above the deflector in the direction of the discharge opening as a preheated gas and promotes the effect of the ejection gas or assumes its function.

BRIEF DESCRIPTION OF THE DRAWINGS

The invention together with its advantages and features is explained in greater detail with reference to sample embodiments shown in the drawings in which.

DESCRIPTION OF THE PREFERRED EMBODIMENTS

Figure 1:
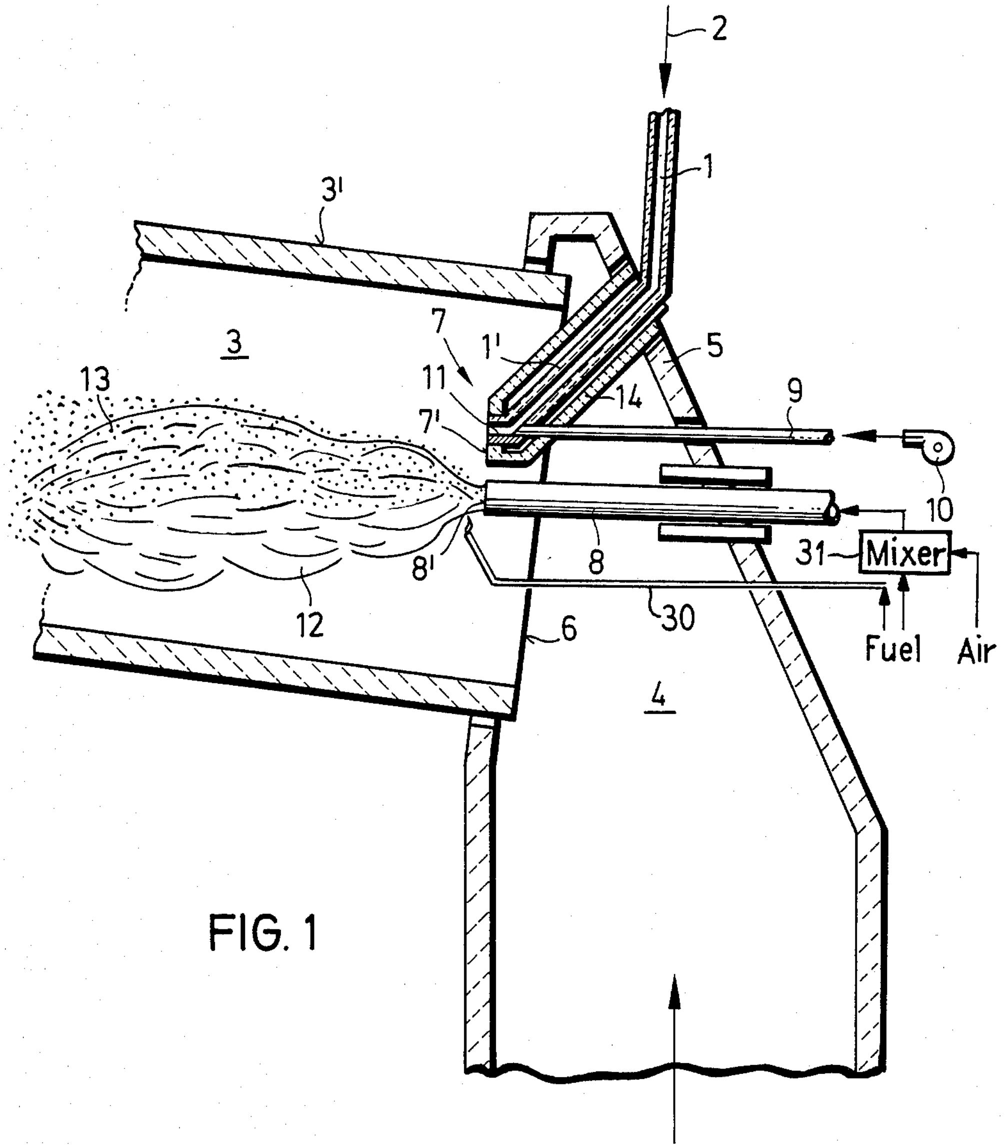
FIG. 1 is a fragmentary view of an apparatus on the cooler side of a tubular kiln provided with a burner, shown in cross section.
Figure 2:
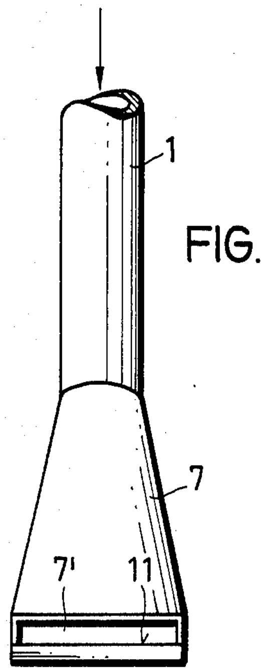
FIG. 2 is a view in elevation of a device used for injecting particulate feed into the firing chamber.
Figure 2A:
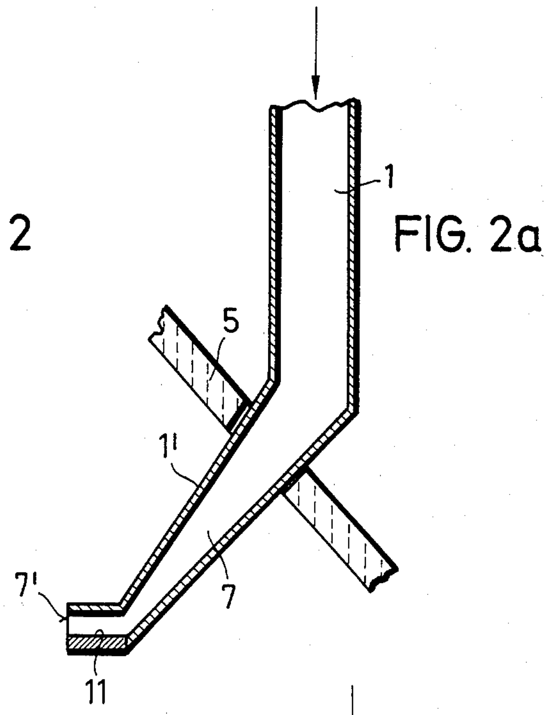
FIG. 2*a* is a cross-sectional view of the device shown in FIG. 2.

In FIG. 1, reference numeral 1 has been applied to a hollow vertical shaft which is connected to the lower stage of a suspension-type preheater or to a calciner. A thermally pretreated and largely calcined product enters the shaft 1 from above as shown by the arrow 2 at a temperature of approximately 850° to 900° C. The stream reaches a relatively high flow rate under the influence of gravity as well as due to its extremely good flowability. A rotary tubular kiln 3′ has a firing chamber 3. The shaft 1 is angled at an acute angle relative to the vertical shortly before it enters the firing chamber 3 and is conducted through or secured to a terminating wall 5 of the rotary tubular kiln 3′ on the burner side. The end of the rotary tubular kiln 3′ is received in a cooling shaft 4.

The introduction means has an orifice area 7 which projects above a burner 8 into the firing chamber 3 of the rotary tubular kiln 3′. An orifice plane 7′ of the introduction means is constructed nearly parallel to an orifice plane 8′ of the burner 8. A pilot burner 30 may be disposed adjacent the burner 8. Fuel is introduced into the pilot burner 30 and into a mixer 31 where it is combined with air and then passed through the burner 8. A deflector 11 is disposed in the orifice area 7 of the introduction means approximately horizontal at an obtuse angle relative to the axis of the angular part 1′ which leads from the bottom of the vertical portion of the shaft 1 to the firing chamber 3. The deflector 11 covers the projection of the flow cross section of the shaft portion 1′ viewed in the direction of the axis.

The provision of the deflector 11 causes the product which is entering to be deflected in the direction of the flame 12 of the burner 8 and is thereby broken up into a cloud 13 of suspended particles. An intimate mixing of the flame 12 and suspended particles 13 thereby occurs whereby a heating with extremely high gradients and a high reactivity of product are advantageously achieved.

The portion 1′ of the hollow shaft is surrounded by a protective jacket 14 consisting of a refractory material because of the high temperatures of the product as well as the flame radiation.

A gas feed means 9 discharges from behind the discharge orifice slightly above the deflector 11, and an ejector gas is introduced into the gas feed means 9 by means of a blower 10. The axis of the gas feed means 9 is substantially parallel to the flame. Ejection gas is injected as a protective film between the product stream and the deflector 11, to separate solids particles and the deflector and thereby reduce the amount of wear on the deflector 11.

FIGS. 2, 2*a*, 3 and 3*a* illustrate discharge orifices 7′ which are fed from the vertical shaft 1 by means of a funnel-like section 7 of increasing lateral dimension. The orifice opening is significantly wider than its height, usually being at least twice as wide as it is high.

Figure 3:
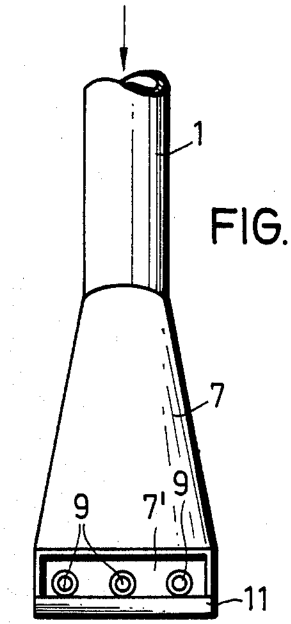
FIG. 3 is a view in elevation of a modified form of an injection device utilizing a plurality of feed means for an ejection gas.
Figure 3A:
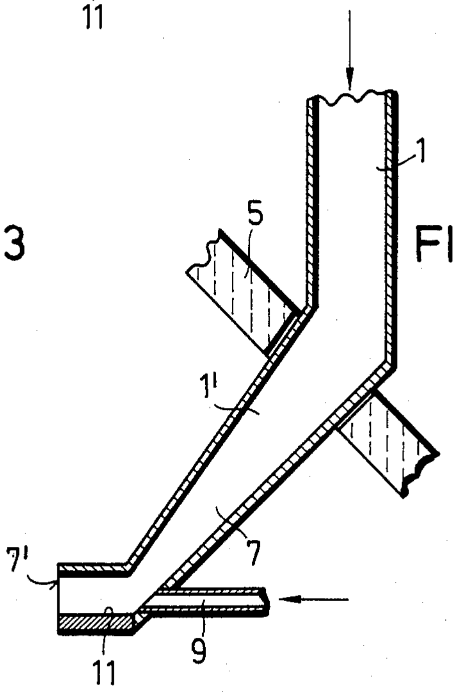
FIG. 3*a* is a cross-sectional view of the device shown in FIG. 3.

FIGS. 3 and 3*a* illustrate a form of the invention embodying a plurality of gas feed means 9 in parallel spaced relationship discharging from behind the discharge orifice 7′.

Figure 4:
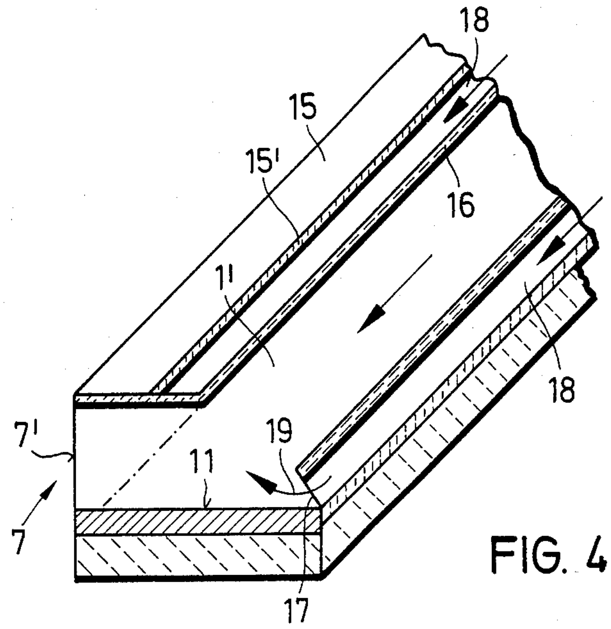
FIG. 4 is a fragmentary view on an enlarged scale in cross section showing the manner in which the shaft projects into the combustion chamber with a cooling jacket.

In FIG. 4 there is illustrated a shaft having an end portion 1′ with a surrounding cooling jacket 15. A flow channel 18 for a coolant is formed between an inside wall 15′ of the cooling jacket 15 and a wall 16 of the shaft portion 1'. Air, for example, can be used as the coolant. The flow path 18 has a discharge opening 17 located above the deflector 11. The warmed cooling air emerging as illustrated by the arrow 19 is simultaneously employed as ejection air and serves for acceleration of the product stream as well as for protecting the deflector 11.

Figure 5:
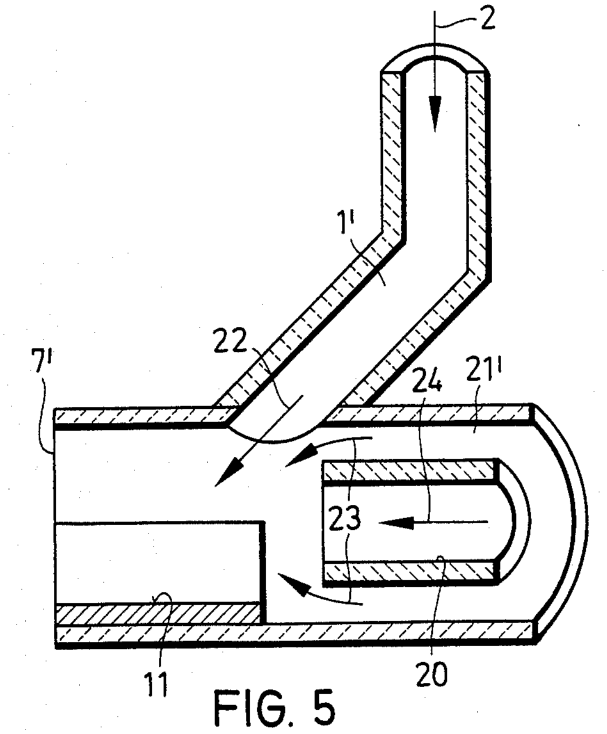
FIG. 5 shows another form of means for introducing the raw material, provided with a burner.
Figure 5A:
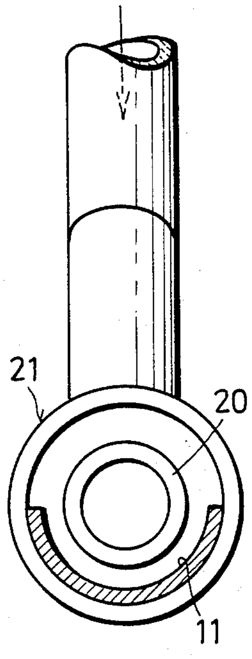
FIG. 5*a* is a view partly in elevation and partly in cross section of the device shown in FIG. 5.

The device of FIGS. 5 and 5*a* includes a burner as part of the apparatus in the firing chamber structure. As viewed in the discharge direction, the apparatus is connected from behind to two concentric conduits 20 and 21. The orifice area 7' has a diameter corresponding to that of the conduit 21. The deflector 11 in the form of a section of a cylinder jacket is inserted in the orifice area 7'. The conduit 21 serves to supply combustion and ejection air and, through the provision of a flow channel 21', surrounds the inner conduit 20 into which coal dust is supplied with a carrier gas. The stream of hot product indicated by the arrow 22 is introduced from the shaft portion 1' and preheated combustion air as shown by arrows 23 and fuel shown by arrow 24 meet and mix in the orifice area 7'. An ideal mixing of fuel and burning product is thereby achieved, the combination occurring in the flame and immediately after entry into the rotary tubular kiln 3'. The product is thereby heated with very high temperature gradients and is burned to clinker under the existing conditions. The product subsequently precipitates out of the gas and collects in the rotary tubular kiln 3' as a product bed. The product bed is conveyed back in countercurrent flow relative to the gas throughput in accord with the shape of the rotary tubular kiln 3' and is discharged into the cooler shaft 4 after complete transformation into clinker.

It will be evident that various modifications can be made to the described embodiments without departing from the scope of the present invention.

We claim as our invention:

1. An apparatus for the rapid burning of a thermally pretreated, at least partially calcined fine grained product into cement clinker comprising:

a rotary tubular kiln having a firing chamber therein, means in said kiln providing a flame extending into said firing chamber, a hollow shaft positioned at the mouth of said kiln and having a discharge orifice discharging into said firing chamber, and a deflector disposed in proximity to said discharge orifice and arranged to break up said fine grained product falling through said hollow shaft and direct it substantially concurrently parallel to said flame to thereby provide extremely high heating gradients for rapid burning of the broken up product.

2. An apparatus according to claim 1 wherein:

said deflector extends at an obtuse angle relative to the axis of said hollow shaft.

3. An apparatus according to claim 1 wherein:

said deflector directs said product above said flame at an acute angle relative to the vertical.

4. An apparatus according to claim 1 which includes:

gas feed means discharging from behind said discharge orifice slightly above said deflector, the axis of said gas feed means being substantially parallel to said flame, and means for introducing a compressed gas into said gas feed means.

5. An apparatus according to claim 1 wherein said discharge orifice has a flat, substantially rectangular opening having a width at least twice as great as its height, and is connected to said hollow shaft by a funnel-like section of increasing lateral dimension.

6. An apparatus according to claim 4 which includes a plurality of gas feed means in parallel spaced relationship discharging from behind said discharge orifice.

7. An apparatus according to claim 1 which includes burner means in said firing chamber, and means for introducing fuel into said burner means.

8. An apparatus according to claim 7 which includes:

a pilot burner disposed in the vicinity of said burner means.

9. An apparatus according to claim 4 which includes a mixing device for mixing said gas with fuel.

10. An apparatus according to claim 1 which includes:

a cooling jacket surrounding at least the portion of said shaft in the vicinity of said firing chamber, and means for delivering a coolant through said cooling jacket.

11. An apparatus according to claim 10 wherein:

said cooling jacket has a discharge opening which directs the coolant toward said reflector.

12. A method for rapid burning of a thermally pretreated, at least partially calcined fine grained product into cement clinker comprising:

dropping particles of said product at a temperature of about 800° to 900° C. with sufficient velocity against a deflector to break up agglomerates of said product and form a cloud of particles, and directing the cloud of particles into substantially parallel relation to a flame at a temperature sufficient to provide extremely high heating gradients and complete the sintering of said particles at a temperature of at least 1250° C.

13. A method according to claim 12 which includes the step of:

directing a current of gas between said falling particles and said deflector along an axis substantially parallel to the axis of said flame.

* * * * *